Dec. 26, 1933.   J. A. KNIGHT   1,941,149
HYDRAULIC SHOCK ABSORBER AND THE LIKE
Filed Aug. 1, 1928   2 Sheets-Sheet 1
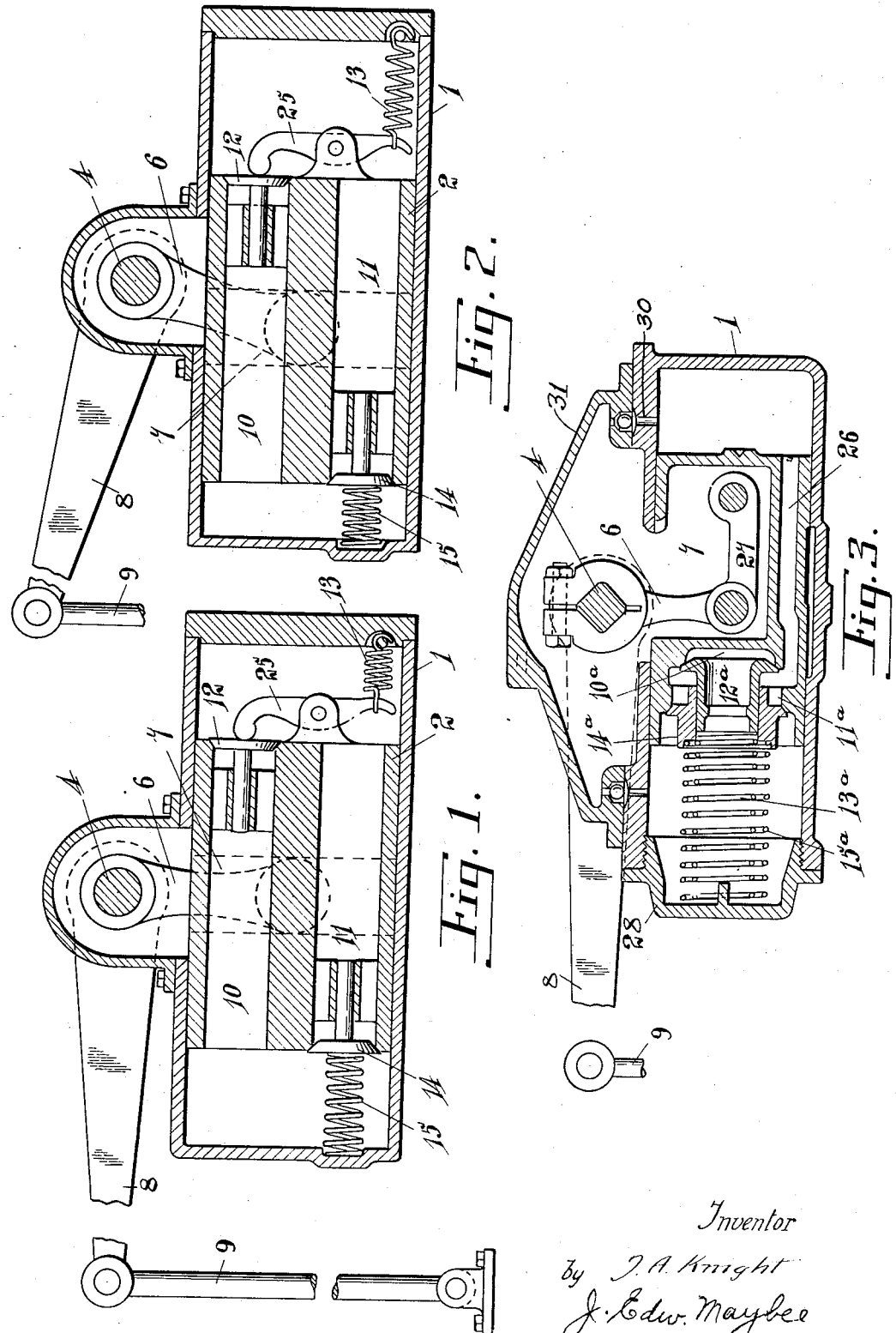

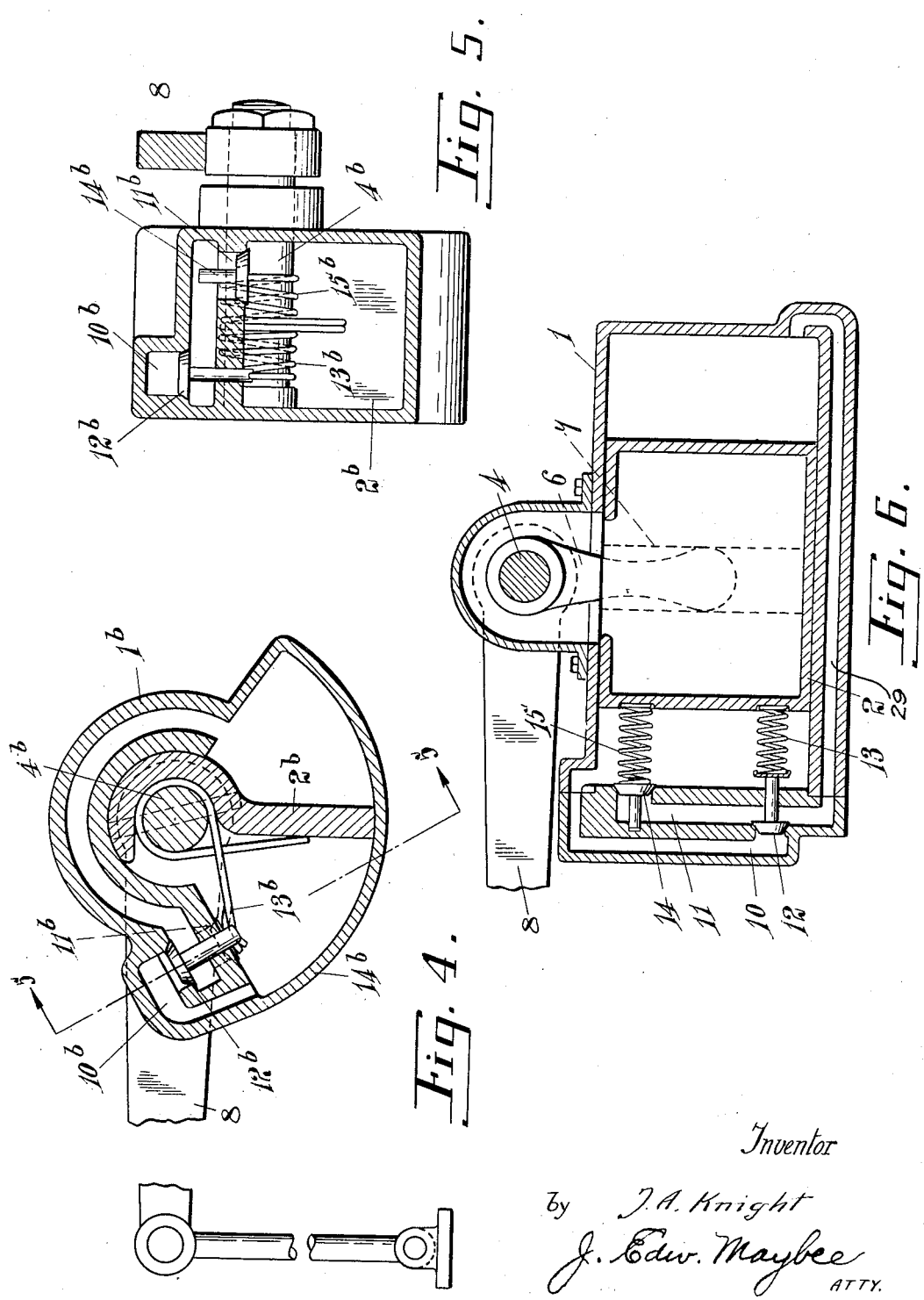

Patented Dec. 26, 1933

1,941,149

UNITED STATES PATENT OFFICE 1,941,149

HYDRAULIC SHOCK ABSORBER AND THE LIKE

John A. Knight, Hamilton, Ontario, Canada

Application August 1, 1928. Serial No. 296,663

9 Claims. (Cl. 188—88)

This invention relates to devices for cushioning the relative movements of two spring connected parts, such as the body and the running gear of a vehicle, and particularly to shock absorbers of the type in which the cushioning is effected by the resistance of a restricted flow of an uncompressible liquid.

This invention relates to shock absorbers such as shown and described in my co-pending application No. 296,009 filed July 28, 1928. In that application I disclosed a form of hydraulic shock absorber adapted to cushion either a movement of approach or a movement of separation of the vehicle parts.

My object in the present invention is to devise a compact and efficient embodiment of the principles disclosed in the aforesaid application, and also to so construct the device that both a movement of approach and a movement of separation may be cushioned by the one unit.

I attain my object by employing a double ended cylinder, the liquid employed being displaced from one end to the other, by the movements of a piston, through suitable communications. Means are provided for spring loading a valve in one communication according to the position of the piston in the cylinder, and a non-return valve is provided in the other communication. This latter valve, when it is desired to cushion the movements in both directions, is also provided with means for spring loading it, the loading increasing when the loading on the other valve is increased and decreasing when it decreases.

The invention is hereinafter more fully described and is illustrated in the accompanying drawings in which Fig. 1 is a side elevation, partly in section, and largely diagrammatic of one embodiment of my invention, the parts being shown in the position they assume with the device attached to a vehicle at rest carrying a normal load;

Fig. 2 a similar view showing the position the parts assume when two parts of a vehicle, to which the parts of the device have been connected have been caused to approach one another by the application of a shock;

Fig. 3 a similar view showing a preferred form of the device;

Fig. 4 a view similar to Fig. 1, showing a modification of the device;

Fig. 5 a cross section on the line 5—5 in Fig. 4; and

Fig. 6 a view similar to Fig. 1, showing a modification of the device.

In the drawings like numerals of reference indicate corresponding parts in the different figures.

Referring particularly to Figs. 1 and 2, 1 is a double ended cylinder in which a piston 2 is fitted, preferably with a liquid tight fit. The cylinder will be adapted in any suitable manner, to be secured to a part of a vehicle such, for example, as the side sill of an automobile chassis. The piston will be connected with another part movable relative to the first as, for example, a vehicle axle, in such a manner that, as the two parts move relative to one another, the piston moves longitudinally of the cylinder.

I show for this purpose a rock shaft 4 journalled in a central upwardly extending housing secured to the upper part of the cylinder. This rock shaft is shown as provided with a rock arm 6 secured thereto and having its free end extending into a recess 7 formed in the piston. To the rock shaft 4, outside the device, is secured an arm 8, to the free end of which is suitably secured a link 9, the other end of which is adapted for connection with a vehicle axle.

The connections of these various parts are only diagrammatically shown, as their specific constructions have no bearing on the present invention.

Two passages 10 and 11 are shown forming communications between the opposite ends of the cylinder. These passages are shown formed through the piston, though other constructions are, of course, possible.

With the device arranged, as shown, the piston, when the parts to which the parts of the device are connected approach one another, will move towards the left in Fig. 1. The passage 10 then forms an outlet from the left hand end of the cylinder and the passage 11 an inlet. A flow of liquid from the left hand end of the cylinder is controlled by the poppet valve 12 at the right hand end of the passage 10, the valve being provided with a stem guided in any known manner. The coil spring 13 is secured at one end to the adjacent end of the cylinder 1 and, at its other end, to a rock arm 25 fulcrumed intermediate its ends on the piston and having its other end bearing against the valve. This valve 12 resists the transfer of liquid from the left hand end of the cylinder to the right hand end of the cylinder in accordance with the tension of the spring, this resistance increasing as the piston moves to the left.

A suitably mounted poppet valve 14 controls the left hand end of the passage 11. The coil spring 15 engages the valve and the adjacent end of the cylinder. Thus, as the piston moves to the left, it progressively and continuously compresses the spring 15. The result of this is that, when the piston starts its return movement to the right, the resistance to a return movement of liquid through the passage 11 is greatest, the resistance gradually decreasing as the piston moves towards the other end of the cylinder.

In Fig. 3 I show a preferred form of the invention. The piston 2 is formed with a much larger recess 7 than in the form shown in Figs. 1 and 2, and the rock arm 6 is pivotally connected to a link 27, the other end of which is pivotally connected to the piston. The passages 10a and 11a correspond to the passages 10 and 11 of Figs. 1 and 2, but have a part 26 in common. The valves 12a and 14a controlling the passages 10a and 11a are tubular and are sleeved the one within the other. Concentric coil springs 13a and 15a engage the valves and the adjacent end of the cylinder. With this arrangement it is possible to dispense with the use of the rock arm 25. Further, both valves are at the same end of the piston and are readily accessible, since the end 28 of the cylinder may be formed as a screw cap, thus facilitating assembly and permitting of the springs being changed to suit the requirements of the different vehicles with which the device is used.

Ball checked passages 30 form a communication between the cylinder ends and the interior of the housing 31 so that the cylinder ends will be replenished with liquid from the interior of the housing by maintaining a suitably high liquid level in the latter.

When the piston moves to the left from the position shown in Fig. 3 the pressure of the fluid in the adjacent end of the cylinder forces the valve 12a from its seat, as the area of its seated end is greater than that of its tubular stem, and liquid flows to the right hand end of the cylinder. When movement takes place in the reverse direction the valve 12a is held by the pressure against the back of the head and the valve 14a controls the flow from the right hand end of the cylinder to the left through the passages 26 and 11a.

In Figs. 4 and 5 I show my invention as applied to a piston and cylinder of the oscillating type. A vane-shaped piston 2b is connected to the rock shaft 4b mounted in the segmental cylinder 1b. The rock arm 8 is secured to the outer end of the rock shaft 4b. The passages 10b and 11b are formed in the cylinder casing and are controlled by the poppet valves 12b and 14b. These valves are spring loaded by the coil springs 13b and 15b mounted on the rock shaft 4b and have arms bearing against the piston and the respective valves.

The mode of operation, it will be seen, is substantially the same in this form as in the others described.

In Fig. 6 the passages 10 and 11 are formed in one end of the cylinder and have a part 29 in common leading to the interior of the opposite end of the cylinder. The valves 12 and 14 control these passages and are spring pressed by the coil springs 13 and 15. When the piston moves to the left, the spring 15 is compressed to increase the loading of the valve 14 so that the resistance to a return movement of the piston is varied according to the extent of movement of the piston in loading the valve. The loading of the valve 12 is also increased at the same time as that of the valve 14 but, as it only serves as a check valve, its spring may be so light that variations of its degree of compression are immaterial.

Many other modifications are possible which would fall within the scope of my invention.

With the device arranged as described, any movement of approach of the parts of the vehicle to which the device is attached will be resisted in accordance with the loading of a coil spring. It is also evident that this resistance gradually increases as the parts approach one another. It is also evident that the movement of the piston, as the vehicle parts approach one another, continuously and progressively increases the tension of a second coil spring, so that the initial resistance to the separation of the vehicle parts, after such an approach, is great or small in proportion to the extent of the approach, and this resistance continuously decreases as the piston moves back in the reverse direction.

In some cases it may not be desirable to introduce any appreciable resistance to the approach of the vehicle parts, in which case the tension of the coil spring 13a in Fig. 3 may be made so slight that it merely serves to position the valve 14a to act as a check valve to prevent back flow to the left hand of the cylinder when the piston, after having been moved to the left, is returning towards its normal position, or any suitable non-return valve may be employed.

From the above description it will be seen that I have devised a hydraulic shock absorber in which the resistance to rebound is automatically increased in a substantially definite proportion to the extent of the approach of the vehicle parts and substantially independent of the rate of the movement, and also one in which, if desired, a resistance to the movement of approach of the parts may be provided which automatically increases as the two parts approach one another.

What I claim as my invention is:

1. A shock absorber of the hydraulic type comprising a cylinder closed at both ends; a piston movable in said cylinder; passages for the flow of liquid from either end of the cylinder to the other; independent spring loaded valves controlling the flow from each end; and means for varying the spring loading of such valves according to the position of said piston in said cylinder.

2. A shock absorber of the hydraulic type, comprising a cylinder closed at both ends; a piston movable in said cylinder; passages for the flow of liquid from either end of the cylinder to the other; independent acting spring loaded valves controlling the flow from each end; and means for increasing the spring loading of both said valves as the piston moves toward a predetermined end of the cylinder.

3. A shock absorber of the hydraulic type comprising a cylinder closed at each end; a piston movable in said cylinder; two passages forming a communication between opposite ends of the cylinder; valves controlling the flow in said passages; and spring loading means for the said valves adapted to be varied by the movements of the piston in the cylinder, the resistance to flow in both passages being increased as the piston moves in one direction and decreased in both passages as it moves in the opposite direction.

4. A shock absorber of the hydraulic type comprising a cylinder closed at each end; a piston movable in said cylinder; two passages in the piston forming a communication between opposite ends of the cylinder; valves controlling the flow in said passages; and spring loading means for both of said valves adapted to be varied by the movements of the piston, the resistance to flow in both passages being increased as the piston moves in one direction and decreases as it moves in the opposite direction.

5. A shock absorber of the hydraulic type comprising a cylinder closed at each end; a piston movable in said cylinder; two passages in the piston forming a communication between opposite ends of the cylinder; tubular concentric valves controlling the flow in said passages and forming part of one passage; and springs, each engaging one of said valves and the cylinder adapted to be compressed as the piston moves towards the adjacent end of the cylinder.

6. A shock absorber of the hydraulic type comprising a cylinder closed at both ends; a communication between said ends; a piston movable in said cylinder; a spring loaded valve offering effective resistance to flow through said communication from one end of the cylinder to the other in one direction; a spring loaded valve controlling flow in the reverse direction; means for increasing the spring loading of the last mentioned valve in proportion to the displacement of the piston to cause a flow in the first mentioned direction, said loading providing an effective, and substantially the sole, resistance to flow in the reverse direction for any position of the piston.

7. A shock absorber of the hydraulic type comprising a cylinder closed at both ends; a piston movable in said cylinder; passages for the flow of liquid from either end of the cylinder to the other; independent spring loaded valves controlling the flow from each end; and means for varying the spring loading of such valves according to the position of said piston in said cylinder, said spring loading providing an effective and substantially sole resistance to flow for any position of the piston.

8. A shock absorber of the hydraulic type comprising a cylinder closed at each end; a piston movable in said cylinder; two passages in the piston forming a communication between opposite ends of the cylinder; tubular concentric valves controlling the flow in said passages and forming part of one passage; and spring means loading said valves and adapted to be compressed as the piston moves towards the adjacent end of the cylinder.

9. A shock absorber of the hydraulic type comprising a cylinder closed at both ends; a communication between said ends; a piston movable in said cylinder; means for producing a substantial resistance to flow through said communication from one end of the cylinder to the other in one direction; a spring loaded valve controlling flow in the reverse direction; means for increasing the spring loading of the last mentioned valve in proportion to the displacement of the piston to cause a flow in the first mentioned direction, said loading providing an effective, and substantially the sole, resistance to flow in the reverse direction for any position of the piston.

JOHN A. KNIGHT.